(12) United States Patent
Salomons

(10) Patent No.: US 10,104,137 B2
(45) Date of Patent: Oct. 16, 2018

(54) RECORDING OF ABR CONTENT

(71) Applicant: TELEFONAKTIEBOLAGET LM ERICSSON (PUBL), Stockholm (SE)

(72) Inventor: Edwin Salomons, Dublin (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 307 days.

(21) Appl. No.: 14/963,767

(22) Filed: Dec. 9, 2015

(65) Prior Publication Data

US 2017/0171264 A1    Jun. 15, 2017

(51) Int. Cl.
*H04L 29/06*        (2006.01)
(52) U.S. Cl.
CPC ................. *H04L 65/4069* (2013.01)
(58) Field of Classification Search
CPC ............. H04L 65/4069; H04L 65/4084; H04L 65/602; H04L 65/60
USPC ........................................................ 709/219
See application file for complete search history.

(56) References Cited

U.S. PATENT DOCUMENTS

| | | |
|---|---|---|
| 6,697,567 B1 | 2/2004 | Suzuki |
| 2005/0238318 A1 | 10/2005 | Watanabe |
| 2009/0144783 A1 | 6/2009 | Lee et al. |
| 2010/0158101 A1 | 6/2010 | Wu et al. |
| 2013/0312046 A1 | 11/2013 | Robertson et al. |
| 2015/0163484 A1 | 6/2015 | Li |
| 2015/0188963 A1 | 7/2015 | Bulava et al. |
| 2015/0288617 A1 | 10/2015 | Dasher et al. |
| 2015/0289003 A1 | 10/2015 | Huber et al. |
| 2015/0350704 A1 | 12/2015 | Horen et al. |
| 2016/0014184 A1* | 1/2016 | Rehan ................... H04L 5/0085 709/219 |
| 2016/0088322 A1* | 3/2016 | Horev ................ H04N 21/8456 725/14 |
| 2016/0112732 A1* | 4/2016 | Li ......................... H04L 65/605 725/116 |

* cited by examiner

*Primary Examiner* — Tu Nguyen

(57) ABSTRACT

A system and method for recording ABR content at a client recording device. A variety of recording service selection mechanisms may be applied at the client side based on network bandwidth conditions and other criteria for selecting ABR content fragments encoded at suitable bitrate quality levels to be downloaded for recording at the client recording device. One or more post-recording optimization schemes may also be applied in one arrangement with respect to, for example, the client recording device's media storage space.

14 Claims, 9 Drawing Sheets

RECORDING OF ABR CONTENT

FIELD OF THE DISCLOSURE

The present disclosure generally relates to communication networks. More particularly, and not by way of any limitation, the present disclosure is directed to a system and method for effectuating recording of content in an adaptive bitrate (ABR) streaming environment.

BACKGROUND

Adaptive bitrate (ABR) streaming of media has become a popular approach for delivering multimedia content over the Internet. Example streaming implementations use a "client-controlled" methodology in which the client requests media segments from a content server at an appropriate time, wherein data transfer typically takes place over HyperText Transfer Protocol (HTTP)-based networks utilizing reliable and/or unreliable transport mechanisms disposed between the media content sources and one or more clients. It should be appreciated that the infrastructure for HTTP-based streaming is far more widespread than that of other media streaming protocols such as Real-time Transport Protocol (RTP) and Real Time Streaming Protocol (RTSP).

Transmission of ABR media over unreliable transport can be problematic, however. Further, network utilization is not evenly spread throughout the day and dimensioning the network capacity for busy times of day carries a high cost. Such issues thwart recording of ABR content at a local storage device in an optimal manner.

SUMMARY

The present patent disclosure is broadly directed to systems, methods, apparatuses, as well as client devices and associated non-transitory computer-readable media for facilitating recording of ABR content at a client recording device. A variety of recording service selection mechanisms may be applied at the client side based on network bandwidth conditions and other criteria for selecting ABR content fragments encoded at suitable bitrate quality levels to be downloaded for recording at the client recording device. One or more post-recording optimization schemes may also be applied in one arrangement with respect to, for example, the client recording device's media storage space.

In one aspect, an embodiment of a method operating at a client recording device disposed in an ABR communications network is disclosed. The claimed embodiment comprises, inter alia, receiving ABR program fragments of a particular program from a network node for recording at the client recording device via an ABR streaming session, wherein the ABR program fragments may initially comprise segments of varying bitrate quality. After a predetermined amount of time, a constant bitrate quality requirement is applied so as to receive ABR program fragments encoded at a specified bitrate, wherein a recording time pointer (RTP) associated with the client recording device's video buffer is allowed to vary with respect to the particular program's real-time content time parameter (CTP) associated with a live buffer at the network node. For instance, the RTP may lag behind the CTP for complex ABR program content depending on, e.g., complexity of the program content being recorded, bandwidth available for the ABR streaming session, etc.

In a related aspect, another embodiment of a method operating at a client recording device disposed in an ABR communications network is disclosed. The claimed embodiment comprises, inter alia, recording ABR program fragments of a particular program received via an ABR streaming session with a network node, wherein each recorded ABR program fragment is stored at multiple bitrate quality levels, e.g., a subset of all available bitrates identified for the particular program, and creating local manifest files for the recorded ABR program fragments. When a playback message is received from a local ABR player device for the particular program, the client recording device provides the local manifest files to the local ABR player device. Responsive to ABR fragment requests from the local ABR player device based on the manifest file information, the ABR program fragments at requested bitrate quality levels are transmitted to the local ABR player device for playback of the particular program.

In another aspect, an embodiment of a client recording device operative in an ABR communications network is disclosed. The claimed embodiment comprises, inter alia, one or more processors and a storage unit coupled thereto, wherein the storage unit is operative to store ABR program fragments for one or more programs downloaded from one or more network nodes via respective ABR streaming sessions. A bandwidth monitor configured to monitor bandwidth conditions on a network connection relative to the one or more ABR streaming sessions is provided under control of the one or more processors. A persistent memory module having program instructions stored therein is coupled to the one or more processors, which program instructions are configured perform when executed by the one or more processors: facilitate receiving ABR program fragments of a particular program from a network node for recording at the storage unit via an ABR streaming session, the ABR program fragments comprising segments of varying bitrate quality; and apply, after a predetermined amount of time, a constant bitrate quality requirement for receiving ABR program fragments of the particular program encoded at a specified bitrate, thereby allowing a recording time pointer (RTP) associated with the client recording device's video buffer to vary with respect to the particular program's real-time content time parameter (CTP), wherein the RTP is configured to lag behind the CTP for complex ABR program content depending on, e.g., complexity of the program content and bandwidth conditions relative to the ABR streaming session.

In a further aspect, another embodiment of a client recording device operative in an ABR communications network is disclosed. The claimed embodiment comprises, inter alia, one or more processors and a storage unit coupled thereto, wherein the storage unit is operative to store ABR program fragments for one or more programs downloaded from one or more network nodes via respective ABR streaming sessions. A bandwidth monitor configured to monitor bandwidth conditions on a network connection relative to the one or more ABR streaming sessions is provided under control of the one or more processors. A persistent memory module having program instructions stored therein is coupled to the one or more processors, which program instructions are configured perform when executed by the one or more processors: record, at the storage unit, ABR program fragments of a particular program received via an ABR streaming session with a network node, each recorded ABR program fragment being stored having multiple bitrate quality levels, e.g., a subset of all available bitrates identified for the particular program; create local manifest files for the recorded ABR program fragments; provide local manifest files to a local ABR player device upon receiving a playback message; and responsive to requests from the local ABR player device, provide the ABR program fragments at requested bitrate quality levels to the local ABR player device for playback of the particular program.

In still further aspects, one or more embodiments of a non-transitory computer-readable medium containing computer-executable program instructions or code portions stored thereon are disclosed for performing one or more embodiments of the methods set forth herein when executed by a processor entity of a network node, a client recording device, or a client player device, and the like. Further features of the various embodiments are as claimed in the dependent claims appended hereto.

Benefits of the present invention include, but not limited to, providing a recording service selection mechanism that allows for selection of appropriate ABR fragments for recording at a client device in an intelligent manner based on a variety of network connection metrics as well as other heuristics. By selectively downloading higher quality fragements during off-peak times, not only is network congestion and/or utilization improved but also the quality of a recording is enhanced by heuristics-based replacement of low quality fragments. In addition, local storage capacity at a client recording device is more efficiently utilized in certain embodiments of the present invention. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Figure 1:
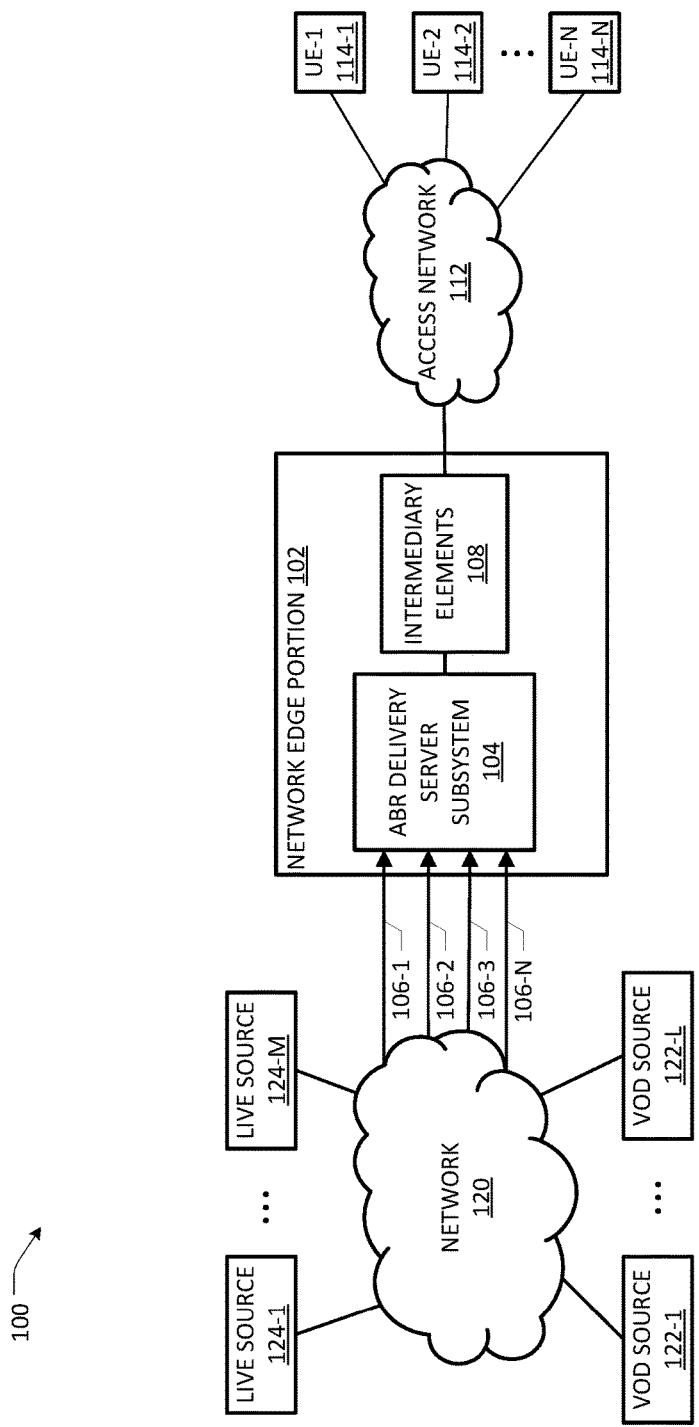
FIG. 1 depicts a generalized ABR network environment wherein one or more embodiments of the present invention may be practiced for facilitating recording of ABR content at a client recording device responsive to various channel related conditions and other selection criteria.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services, either in a virtualized or non-virtualized environment, with respect to a plurality of subscribers and associated user equipment that are operative to receive/consume content in an adaptive bitrate (ABR) streaming network. As such, some network elements may be disposed in a wireless radio network environment whereas other network elements may be disposed in a public packet-switched network infrastructure, including or otherwise involving suitable content delivery network (CDN) infrastructure. Further, suitable network elements including one or more embodiments set forth herein may involve terrestrial and/or satellite broadband delivery infrastructures, e.g., a Digital Subscriber Line (DSL) architecture, a Data Over Cable Service Interface Specification (DOCSIS)-compliant Cable Modem Termination System (CMTS) architecture, a suitable satellite access network architecture or a broadband wireless access network architecture. Accordingly, some network elements may comprise "multiple services network elements" that provide support for multiple network-based functions (e.g., A/V media delivery policy management, session control, QoS policy enforcement, bandwidth scheduling management, e.g., based on weighted fair queuing (WFQ), subscriber/device policy and profile management, content provider priority policy management, streaming policy management, and the like), in addition to providing support for multiple application services (e.g., data and multimedia applications). Example subscriber end stations or client devices may comprise ABR client devices and/or non-ABR client devices, which may include progressive download client devices, for instance, and may comprise content player devices (i.e., players), standalone recording devices (i.e., recorders), as well as equipment stations that may include both functionalities. Illustrative client devices may therefore include any device configured to execute, inter alia, one or more streaming client applications for receiving, recording, storing, and/or rendering content, live media and/or static/on-demand media, from one or more content providers, e.g., via a broadband access network, in accordance with one or more streaming protocols and technologies such as, e.g., Microsoft® Silverlight® Smooth Streaming, HTTP streaming (for instance, Dynamic Adaptive Streaming over HTTP or DASH, HTTP Live Streaming or HLS, HTTP Dynamic Streaming or HDS, etc.), Icecast, and so on. Accordingly, such client devices may include set-top boxes (STBs), networked TVs, personal/digital video recorders (PVR/DVRs), networked media projectors, portable laptops, netbooks, palm tops, tablets, smartphones, multimedia/video phones, mobile/wireless user equipment, portable media players, portable gaming systems or consoles (such as the Wii®, Play Station 3®, etc.) and the like, which may access or consume content/services provided via a suitable high speed broadband connection for purposes of one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is a generalized ABR streaming network environment 100 wherein one or more embodiments of the present invention may be practiced for facilitating recording of ABR content at a client recording device responsive to channel conditions (e.g., signal-to-noise ratios, bandwidth constraints, network congestion/contention, etc.) and other criteria that may applied in a number of recording service selection mechanisms or processes as part of client-side service logic in order to modulate the recording behavior of the recording device. It will be realized that one or more embodiments set forth herein may be advantageously practiced in combination with bandwidth management techniques, delivery optimization methodologies, etc., for example, responsive to a client's video buffer characteristics, player device/display characteristics and configurations, network/connection conditions, and the like, although it is not necessary that all such features be included in a particular embodiment. In general, the terms "program", "program content", "media content," "media asset" or "content file" (or terms of similar import) as used in reference to at least some embodiments of the present patent disclosure may include digital assets or program assets such as any type of audio/video (A/V) content that may comprise live capture media or static/stored on-demand media, e.g., over-the-air free network television (TV) shows or programs, pay TV broadcast programs via cable networks or satellite networks, free-to-air satellite TV shows, IPTV programs, Over-The-Top (OTT) and Video-On-Demand (VOD) or Movie-On-Demand (MOD) shows or programs, time-shifted TV (TSTV) content, etc., that may be delivered using any ABR technologies, including multicast, unicast, progressive download, etc. By way of illustration, a plurality of live content sources 124-1 to 124-M and a plurality of static/on-demand content sources 122-1 to 122-L are shown in the ABR streaming environment 100 that exemplify various such content sources, from which program content or media assets may be transmitted via a network 120 (e.g., an IP network using one or more transport layer protocols such as UDP or TCP in conjunction with an application layer protocol such as HTTP or other protocols) as segmented content streams that are encoded and/or transcoded at different bitrates (i.e., representations), to an edge network portion 102 (also sometimes referred to as "network edge") serving a plurality of user equipment (UE) devices 114-1 to 114-N via or in association with an access network 112. For example, reference numerals 106-1 to 106-N refer to a plurality of media streams (including ABR segmented VOD streams as well as ABR segmented live media streams, for instance) transmitted from such plurality of content sources. Appropriate manifest files containing metadata information describing the multiple bitrates used for encoding content at different resolutions and location pointers (e.g., Uniform Resource Locator (URL) pointers, etc.) of various segments of encoded media content are also provided to the edge network infrastructure 102 comprising an ABR delivery server subsystem 104 for effectuating streaming sessions via the access network 112. In an example implementation, the access network 112 may be comprised of a DSL network architecture, a DOCSIS-compliant Cable Modem Termination System (CMTS) network architecture, a mobile telecommunications network architecture, a CDN architecture, a metro Ethernet architecture, and/or a Fiber to the X (home/curb/premises, etc., FTTX) architecture. Accordingly, suitable intermediate elements such as routers, access multiplexers, CMTS nodes, etc., collectively shown as elements 108, may be provided in association with the network edge 102 for coupling with the access network 112. In addition, one skilled in the art will recognize that the ABR streaming environment 100 may be architected as a hierarchical organization wherein the various content sources and associated ABR processing systems may be disposed at different hierarchical levels of the network architecture in an illustrative implementation, e.g., super headend (SHE) nodes, regional headend (RHE) nodes, video hub office (VHO) nodes, etc. that ultimately provide the media streams to the serving edge node portion and associated access network 112 for further distribution.

Although not specifically shown in FIG. 1, at least a sub-group of UE devices 114-1 to 114-N may be operative as tethered or untethered customer premises equipment (CPE) devices associated with a subscriber premises in one example implementation. Regardless of the type of access network 112 or whether a UE device is part of a subscriber premises, a served UE device is operative as an ABR streaming client that may include one or more suitable ABR media recorders and/or players configured to interoperate with applicable streaming protocols and technologies.

Figure 2:
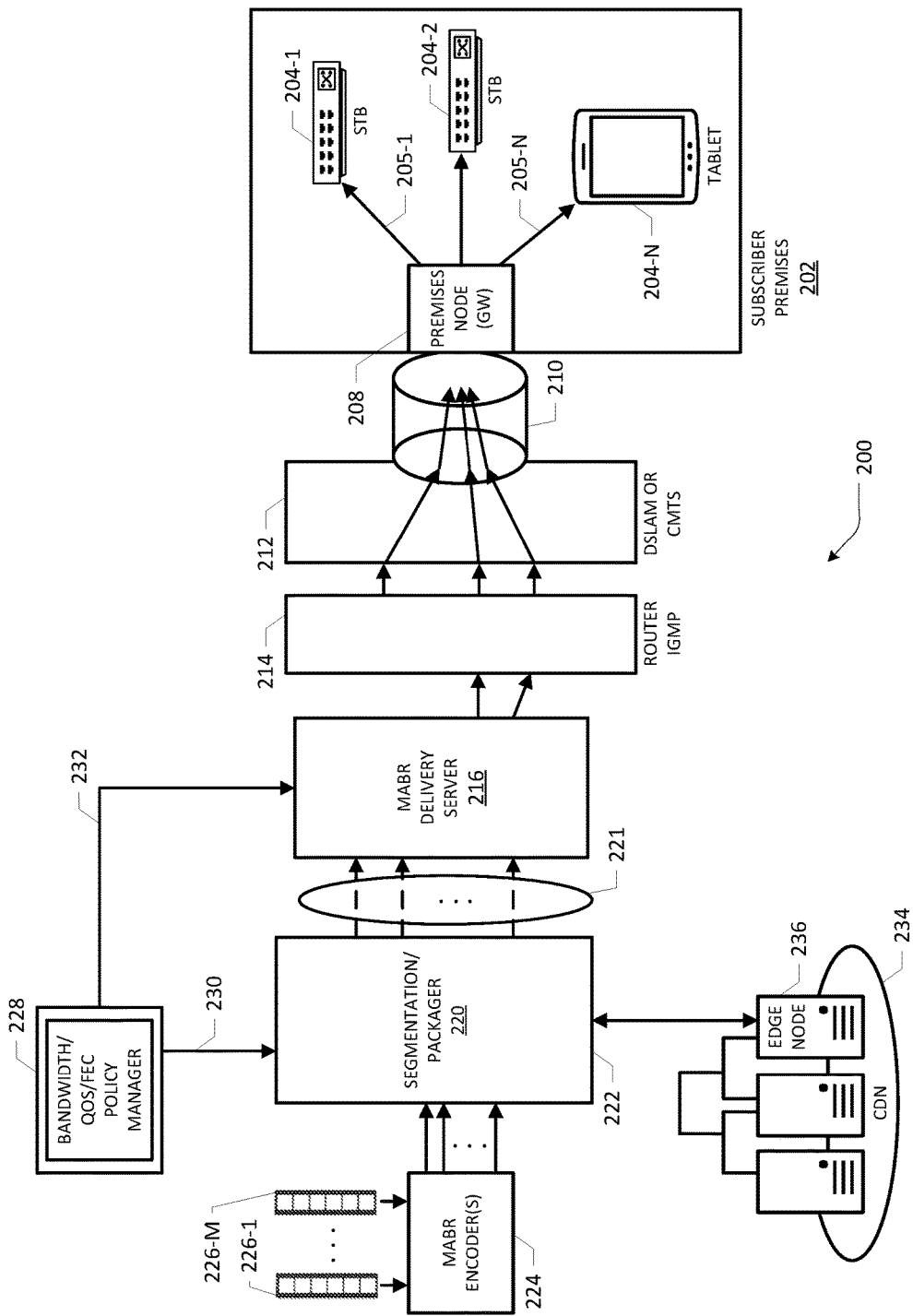
FIG. 2 depicts another aspect of an example ABR network environment with additional elements illustrated according to an embodiment of an IPTV application using multicast ABR.

FIG. 2 depicts another aspect of an example ABR network environment 200 with additional elements illustrated according to an embodiment using multicast ABR (MABR) architecture wherein a plurality of media asset channels may be provided in an IPTV application to UE client devices disposed in a subscriber premises 202. In the context of the present disclosure, the MABR communications network environment 200 may implemented as an end-to-end network architecture for delivering MABR media content (and advertisement content, where applicable) using any of the network delivery technologies described above. By way of example and introduction, MABR streaming delivery is broadly set forth herein that is applicable to both DSL and DOCSIS architectures without necessarily being limited thereto. As will be appreciated by one skilled in the art, content may be delivered using either multicast ABR techniques or unicast ABR techniques. In a unicast delivery, a subscribing receiver may be provided with a direct and unique two-way path through the delivery network all the way back to a serving media server supplying the required data stream. The main streaming activity is managed on a one-to-one basis between the receiver and the source server in a communication session. The network between the source server and receiver may typically comprise a series of intermediate servers installed at network nodes, which may not be directly involved in the service but only support the transfer of a packet stream. Typically, the protocols used to support the transmissions are simple forms of Internet Protocol (IP) itself augmented by one or more higher layer protocols to provide flow control. These protocols extend across the span of the network connection between the source server and a given receiver.

A unicast system can support ABR streaming, which allows some form of rate adaptation. A given service may be encoded at a selection of different bitrates (known as representations, as noted hereinabove), with synchronised boundary points at defined locations (e.g., every 50 frames). For each representation, content between successive boundary points is converted into a discrete file. Clients fetch a segment of one of the representations in turn. If a higher or a lower bit rate is required, the next segment is fetched from one of the other representations. The segments are constructed such that there is no discontinuity in decoded pictures/audio if the client switches between representations at the boundary points. This system may require a unicast two-way path between source and receiver to request files and deliver the requested files.

Multicast delivery makes more efficient use of bandwidth by sharing content streams among several receivers. Intermediate network elements (e.g., routers or switches) are now more closely involved in the service delivery such that some control and management functions are delegated from the source server. This control is supported by more extensive protocols devised for this type of application such as, e.g., Protocol Independent Multicast (PIM) and Internet Group Multicast Protocol (IGMP). When a receiver requests a given media item or asset, the network router system finds an existing stream of that content already in the network and directs a copy of it to that receiver from a serving cable headend, a video head office or an appropriately proximal network node in an edge distribution network. The requesting receiver may be provided with the capability to join this existing stream under controlled conditions that do not adversely affect existing receivers. Any receiver in this group may also be provided with the ability to leave the stream, or pause its consumption, without affecting the others. Additionally, there may be an implementation where a video pipe delivering services to a premises is operative to deliver content to one or more progressive download clients of the premises that are designed to receive the video in bursts.

Subscriber premises 202, which is served by a suitable broadband pipe 210, is illustratively shown as having a plurality of client devices or substations 204-1 to 204-N, e.g., laptops, STBs (with or without integrated digital video recorders (DVRs) or personal video recorders (PVRs), standalone recorder devices, smartphones, computers, gaming devices or consoles, OTT STBs, or tablets, etc., that may consume multicast content and/or effectuate content recording in accordance with an embodiment of the present patent application, wherein one or more STB stations may be respectively coupled to or otherwise integrated with at least one display device (not specifically shown). In general, UE devices 204-1 to 204-N may be configured to operate with one or more coder-decoder (codec) functionalities based on known or hereto unknown standards or specifications including but not limited to, e.g., Moving Pictures Expert Group (MPEG) codecs (MPEG, MPEG-2, MPEG-4, etc.), H.264 codec, High Efficiency Video Coding or HEVC (H.265) codec, and the like, in order to receive, record, and/or render various programming content that is delivered as a plurality of service channels. A premises network (not explicitly shown), which may be implemented using any suitable wireless or wireline network technologies, may therefore comprise network paths or pipes 205-1 to 205-N for streaming service channel content to respective subscriber stations 204-1 to 204-N.

In an example implementation, subscriber premises 202 may be served via an access network architected over DSL infrastructure, DOCSIS-compliant CMTS infrastructure, and the like, as noted previously. Accordingly, the subscriber premises bandwidth pipe 210 may be disposed between subscriber premises 202 and an access node 212 such as a DSL Access Multiplexer (DSLAM) node or a CMTS node, wherein a suitable premises node or element 208 such as a DSL router/gateway or a cable modem is operative to effectuate communications (including bearer and signaling traffic) with respect to the client devices of the premises. A suitable IGMP switch or router 214 (e.g., IGMPv2/v3-capable Gigabit Ethernet (GigE) multicast router) is coupled to the access node 212 for effectuating suitable IGMP Leave/Join messages with respect to joining, leaving or changing various multicast streams corresponding to the service channels available to subscriber stations 204-1 to 204-N of the subscriber premises 202.

One or more ABR encoders 224, which may be provided as part of a multicast stream formation (MSF) functionality in one example embodiment, are operative to receive a plurality of channel source feeds 226-1 to 226-M corresponding to a group of service channels that may be provided as MABR channels having segmented streams at different bitrate representations. Typically, the ABR encoder 224 receives live feeds from appropriate communications networks, although it is possible in an alternative or additional arrangement for a file-based streamer to read the content files from a disk and stream the content streams via a network to the ABR encoder 224. Accordingly, the channel source feeds may comprise a variety of content or programs as noted previously. Further, VOD content may also be sourced via a CDN 234 and associated edge distribution node(s) 236 as part of service channels provided in an IPTV multicast ABR environment. Regardless of how channel source feeds are generated and provided in the example network environment 200, a server node or subsystem 220 comprising a segmentation and packaging (SAP) unit for segmenting the content streams provided by the encoding block 224 into a series of segments or fragments 221 that may be selectively joined by the subscriber client devices for playing and/or recoding media content. As previously noted, each encoded MABR stream corresponds to a particular bitrate representation (e.g., 10 Mbs to 500 Kbs corresponding to various levels of video quality or resolutions, e.g., standard definition or SD, high definition or HD, ultra HD or UHD, etc.) of a specific service channel or media asset channel to which a subscriber station may tune. Depending on implementation, the MBAR segment streams may be forwarded to an MABR service node 216 that provides particular channels to IGMP router 214 for joining and leaving as may be requested by the subscriber stations 204-1 to 204-N. Further, a bandwidth/QoS policy manager 228 may also be provided to generate suitable bandwidth and policy management signals 230, 232 to service nodes 220, 216 in order to configure appropriate levels of encoding bitrates and the like on the server side. As can be appreciated, bitrate levels in an ABR scheme may be set through operator configuration in one implementation, e.g., tuned to the expected network conditions.

Figure 3:
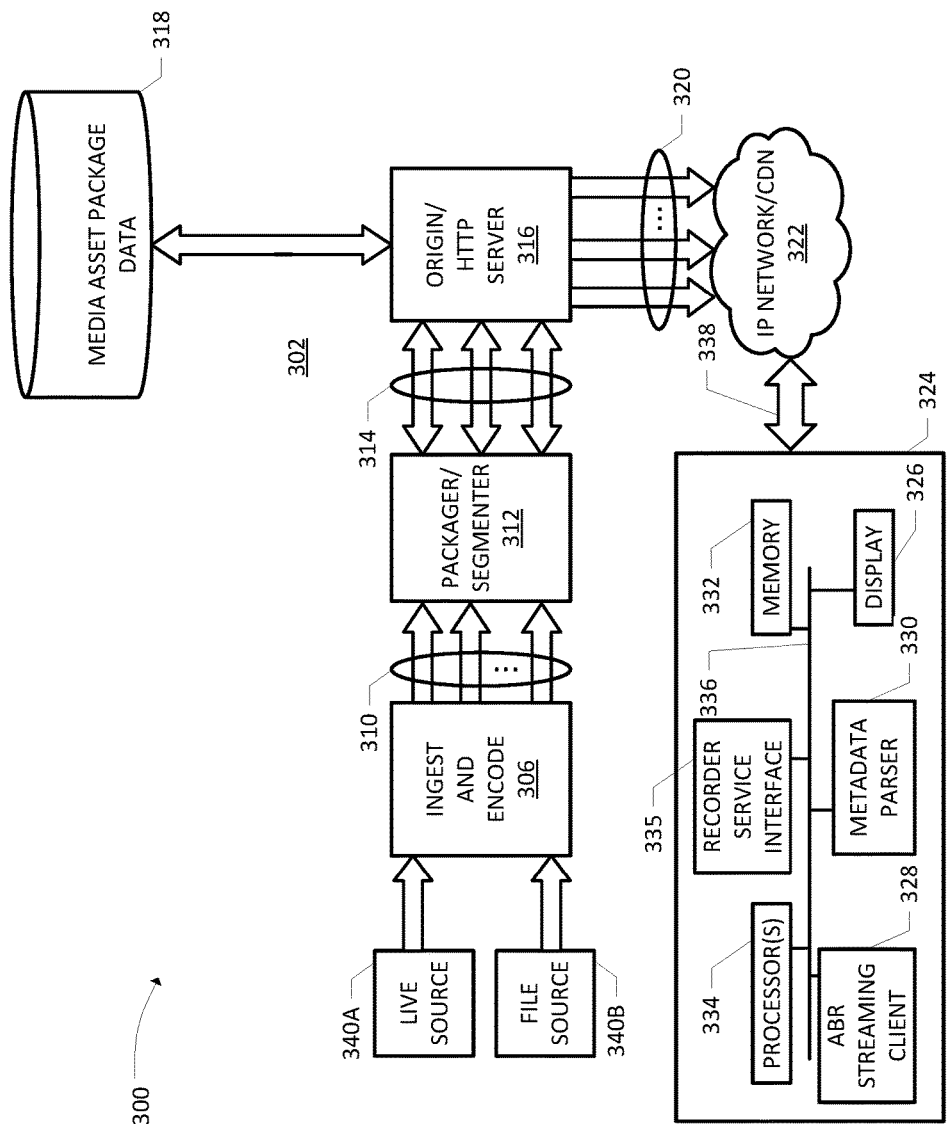
FIG. 3 depicts an example embodiment of an ABR segmentation/packaging server system for generating multiple bitrate representations of ABR program fragments operative for recording and/or playback in an ABR network environment.

FIG. 3 depicts an example ABR segmentation/packaging server system 302 operative to provide multiple bitrate representations of a source media channel an ABR network environment 300 according to an embodiment. One skilled in the art will recognize upon reference hereto that the ABR network environment 300 is another aspect or variation of the network environments 100 and 200 shown in FIGS. 1 and 2, respectively, suitably modified to exemplify certain additional features of the server system 302 disposed in the ABR network environment 300. By way of illustration, the ABR network environment 300 may be configured to include an IP network and/or an overlay content delivery network or content distribution network (CDN) 322 coupled to the adaptive streaming server system 302. In one implementation, CDN 322 may comprise a delivery architecture over a public or private packet-switched network (e.g., the Internet) and/or a cloud-based delivery system for facilitating high-performance streaming of a variety of media assets or program assets to an example ABR client device or UE device 324. For purposes of one or more embodiments set forth in detail further below, UE device 324 is illustrative of an ABR player device that may be configured to interoperate with a client recorder device (not shown) for effectuating playback of content that may have been recorded in accordance with the teachings of the present patent application. It will be apparent that one or more such player devices as well as recorder devices may be associated with a subscriber/customer for consuming content (e.g., receiving, decoding/decrypting, recording, and rendering/displaying) delivered via CDN 322 in any type or number of access technologies including broadband access via wired and/or wireless (radio) communications, as noted previously, wherein the example UE device 324 is illustrative of any one of the subscriber stations or devices UE-1 114-1 to UE-N 114-N and/or subscriber premises devices 204-1 to 204-N described above in reference to FIGS. 1 and 2, respectively. For purposes of the present patent application, the terms "streaming client device" and "client device" (regardless of whether it is a purely recording device, playback device, or a combination of both) may be used synonymously and may comprise any UE device or appliance that in one implementation not only receives program assets for live viewing, recording, playback and/or decoding the content, but also operates as a command console or terminal that can accept user inputs, messages, commands or requests to interact with a network element disposed in IP/CDN 322 and/or associated streaming server systems for controlling transmission of content via a bidirectional interface. As an example, client device 324 may include one or more streaming client modules 328 (e.g., an HLS streaming client, a DASH client, etc.) and associated decoding functionalities depending on the streaming technologies implemented (e.g., HLS, MPEG-DASH, etc.) as well as a metadata parser module 330 operative to parse metadata information (e.g., relating to the encoded media segments) received via a communication interface 338 to the IP/CDN 322.

Streaming client module(s) 328 and the metadata parser module(s) 330 are operably coupled to one or more processors 334 and memory module(s) 332 via a suitable bus structure 336 for effectuating acquisition, decoding and rendering of the streamed media content, e.g., at a display 326. Although not specifically labeled, memory 332 is illustrative at least of a video buffer memory as well as one or more persistent memory modules containing program instructions for execution by the processors 334 in order to provide for the overall control of the UE operations as well as one or more processes in connection with recording content or playing back content that was recorded by another client recording device. Accordingly, a recorder service interface block 335 is illustratively shown for interfacing with a recorder client (not specifically shown) for facilitating playback of program content that is at least partially locally stored as well as the program content retrieved from the network server system as will be set forth in additional detail further below. An example implementation of the ABR client/UE device 324 may also include appropriate user interfaces for viewing one or more Electronic Program Guides (EPGs) that list, identify or otherwise show various streaming channels (live media and/or on-demand) the subscriber is able to receive and/or record. Such user interfaces may also be configured to allow the user to scroll through an EPG (i.e., channel surfing), select or otherwise change a particular streaming channel, and the like.

Continuing to refer to FIG. 3, the example adaptive streaming server system 302 may be configured to accept media content from live sources 304A and static file sources 304B at an ingest/encode block 306 that may employ a variety of source video codecs (e.g., H.264, H.265, MPEG varieties, and the like). Where an input media stream is already encoded or compressed, block 306 may be configured to operate as a transcoder so that one or more ABR representations of the media content at suitable bitrates may be generated. In general operation, the example streaming server system 302 may be configured, under the control of one or more processors executing appropriate program code stored in a persistent memory module (not specifically shown), to effectuate adaptive streaming of content as follows. Initially, source media content is transcoded or otherwise encoded with different bit rates (e.g., multi-rate transcoding) using applicable encoder(s) 306. For example, content of a particular media asset may be transcoded into five video files using variable bit rates (or, synonymously "bitrates" or "representations", as referenced elsewhere in the present patent application), ranging from low to high bit rates (500 Kbps to 10 Mbps, by way of illustration). The particular content is therefore encoded as five different "versions" or "formats", wherein each bitrate is called a profile or representation. Reference numeral 310 refers to a collection of media streams encoded at different bitrates by the encoder 306. As noted previously, encoding bitrates are also indicative of the video quality of the program content, e.g., ranging from SD to HD and beyond. A segmentation/packager 312 is operative to divide each version of the encoded media content into fixed duration segments or chunks, which may be between two and ten seconds in duration, thereby generating a plurality of chunk streams 314. One skilled in the art will recognize that shorter segments may reduce coding efficiency whereas larger segments may impact the adaptability to changes in network throughput and/or fast changing client behavior. Regardless of the chunk size, the segments may be Group-of-Pictures (GOP)-aligned such that all encoding profiles have the same media segment data with properly aligned timing boundaries. One or more suitable metadata files referred to as manifest files are created that describes the encoding rates and location pointers such as, e.g., URL pointers, relative to the various segments of encoded content. An origin/HTTP server 316 is operative to receive the encoded media streams 314 as well as associated manifest files, which may be stored at one or more databases 318 for facilitating delivery of the media to the requesting clients 324 via IP/CDN 320, illustrated as adaptive streams 320, which may be received as multicast, unicast, or progressive download in an arrangement such as the ABR network environments 100 or 200 set forth in FIGS. 1 and 2.

Figure 4:
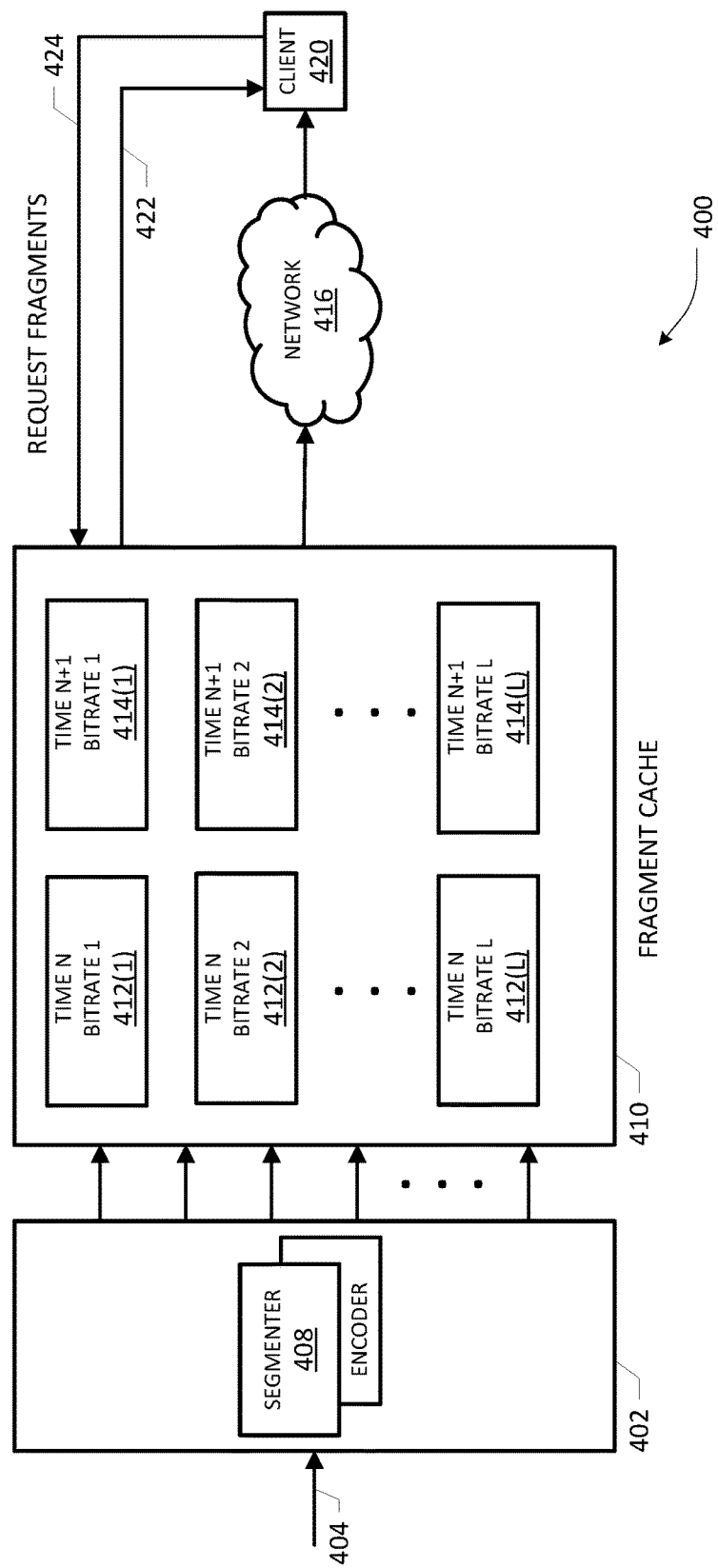
FIG. 4 depicts an ABR network architecture wherein a fragment cache may be provided at a network node for downloading a plurality of fragments via a streaming session for recording at a client device according to an example embodiment.

For purposes of the present patent application, the terms "download", "retrieve", "deliver", "receive", or "record" (and terms of similar import) will be used somewhat agnostically without specifically confining such terms to a particular delivery technology (e.g., multicast, unicast, or otherwise) and, accordingly, the terms such as "ABR content" or "ABR program" are also broadly applicable regardless of the particular delivery technology. Turning to FIG. 4, depicted therein is a simplified ABR network architecture 400 wherein an ABR media fragment cache 410 may be provided at a network node for serving the media fragments to a client recording device 420 via a streaming session for recording the content in accordance with one or more recording service selection methodologies of the present invention. A media source 404 (which is illustrative of any of the media sources shown in FIGS. 1 to 3 described above) is provided to an ABR server node 402 comprising a segmentation/encoder block 408 for effectuating the segmentation and encoding operations as described above. A plurality of bitrate representations (e.g., L representations) of the ABR program media are processed and encoded for storage at the fragment database or cache 410 that may be associated with a suitable delivery node in an ABR network environment. One skilled in the art will recognize that such a delivery node is representative of one or more ABR origin servers, CDN edge nodes or a redistribution nodes, third-party media storage or data center nodes, content provider network nodes, any of which being provided in a cloud-based infrastructure. Reference numerals 412(1) to 412(L) refer to media fragments, or synonymously, segments, at a particular Time=N, each encoded at a particular bitrate of L bitrates. In similar fashion, program segments for Time=(N+1) at L bitrates are shown at 414(1) to 414(L) in the cache 910.

Similar to the ABR network environments shown in FIGS. 1 to 3, a suitable network 416 is operative to facilitate streaming of the media segments to the client recording device 412. Reference numeral 422 refers to a manifest file path (which may be different from the media delivery network 416) by which the client recording node 420 receives appropriate metadata information from the server node. Reference numeral 424 refers to a request message path from the client recording node 420 (which again may be separate from the media delivery network 416) operative to transmit one or more requests for ABR program fragments having select bitrate levels or qualities for downloading.

In accordance with the teachings herein, a recording service selection logic or mechanism provided at the client recording device 420 is operative responsive to processor control and suitable program instructions to apply a number of selection criteria, including network connection related metrics as well as parameters relating to the recording device's storage capacity, utilization, program consumption, historical viewing data, display device priorities and configurations, and the like, either alone or in a select combination thereof, in one or more configurable selection processes, with respect to identifying, selecting and requesting appropriate ABR program segments or fragments for recording. In one embodiment, such service selection criteria may applied in a knowledge-based heuristic mechanism for determining program fragments having suitable bitrates which, as noted elsewhere in the present patent application, define or relate to corresponding video qualities or quality levels of the program. As will be seen in additional detail below, one or more of the selection processes of the present invention may rely on or result in actions such as, e.g., (i) recording of fragments slower/faster than real-time; (ii) recording of multiple bitrate/quality levels; (iii) recording of only a subset of the fragments; (iv) overwriting of existing fragments after initial recording with higher/lower quality levels, and the like. In one embodiment, a recording service selection process or logic may involve imposing a quality level requirement such as, e.g., recording the program fragments at constant quality. One skilled in the art will recognize that the service selection logic in this embodiment may be preferably configured to maintain the picture quality of the recorded ABR program at a constant level, as may be defined by or related to the levels of the encoding bitrates of the ABR program fragments. For complex parts of the program content (e.g., frames with a lot of movement or action, such as in sports programming or the like), this embodiment may result in the recording device falling behind the real-time of the ABR program content. Therefore, in such an embodiment, a "live buffer" for the program content may be provided on the server side so as to enable the recording device to fetch the ABR program fragments that are behind a real-time counter associated with the program. On the other hand, for less complex parts of the program content, the recording device may catch up with the program's real-time, thereby getting closer to the live point in time. However, it should be appreciated that this service selection logic embodiment may not guarantee that the recording is playable from the time at which recording starts.

In another embodiment, a recording service selection mechanism or process operating at the client recording device 420 may involve recording of fragments in real-time at the beginning of the program only. In this arrangement, the service selection mechanism allows for playback of the recording immediately after the recording starts by using the real-time bitrate levels at the beginning of the recording (e.g., as may be determined based on the instantaneous network bandwidth conditions or constraints), and then switches to a more quality optimized mechanism such as an embodiment of the constant quality level requirement discussed above. As a further variation, at a post-recording process, the quality at the beginning of the recording can be optimized after completion of the recording by overwriting any low quality fragments that resulted from the real-time varying bitrates used at the beginning.

In another embodiment, a recording service selection mechanism may be configured to download and record only a subset of the ABR program content, e.g., only the beginning of the program. At the time of playback, the content may be initially played back from local storage and at a suitable timing reference, subsequent fragments are loaded from the network for the remainder of the program. As a further variation, the recording service selection mechanism may be extended or otherwise configured to only record those programs or portions thereof that are likely to be played back, thereby skipping entire recordings if they are deemed unlikely to be played back. In a still further embodiment, a recording service selection mechanism may be configured to download and store multiple bitrate levels for each fragment, for example, a subset of the available set of bitrate levels that may be indicated in the manifest files provided to the client recording device 420. One skilled in the art will recognize that this arrangement allows the content to be played back in ABR form on the home network on other client devices disposed therein. As a further variation, an embodiment of the recording service selection mechanism may be provided with an additional processing step that involves disposing of fragments of select bitrate levels, e.g., discarding or deleting fragments at higher quality levels when the recording gets older and playback has become less likely.

According to yet another embodiment, a recording service selection mechanism of the client recording device 420 may be configured to overwrite recorded fragments with lower quality fragments by reading those fragments from the network, e.g., when the recording gets older and playback has become less likely. In a still further embodiment, the recording service selection mechanism may be configured to increase bitrate quality levels by selectively overwriting recorded fragments with higher quality fragments downloaded during off-peak times when the bandwidth conditions improve and/or bandwidth costs are low. One particular case for this embodiment may be when fragments are recorded in real time for a "pause" buffer and then converted to a recording stored in a more permanent storage unit. After the decision is made to create a recording, fragments that were received at a relatively low quality, may be retrieved at a higher quality and either overwritten or, optionally, maintained as fragments having multiple quality levels.

According to a still further embodiment, a recording service selection mechanism may be configured to increase the number of bitrate quality levels offline. In this embodiment, a recording may be made at varying bitrate levels in real-time or at a constant quality level, which can allow the recording to be available immediately. If there is sufficient time between the record time and the playback time, the client recording device may be configured to use the available bandwidth to retrieve additional bitrate levels. Similar to one of the embodiments set forth previously, this arrangement also allows for ABR playback of the content in the premises on other client devices.

A still further embodiment of a recording service selection mechanism may involve using a combination of local and cloud-based fragments at playback time. In this arrangement, the client recording device locally records the ABR program content using any of the mechanisms above. It should be appreciated that not all bitrate quality levels may be recorded for each fragment of the program, depending on the selection mechanism(s) invoked. During playback, a playback device (e.g., a tablet) operatively coupled to the client recording device retrieves the fragments from the local recorder and falls back to a representation in the cloud for quality levels not available on the recorder. A playback service selection mechanism executing at the playback device under suitable processor and program control may be configured to determine dynamically what fragments to select and from which source as the ABR program is played out.

Figure 5:
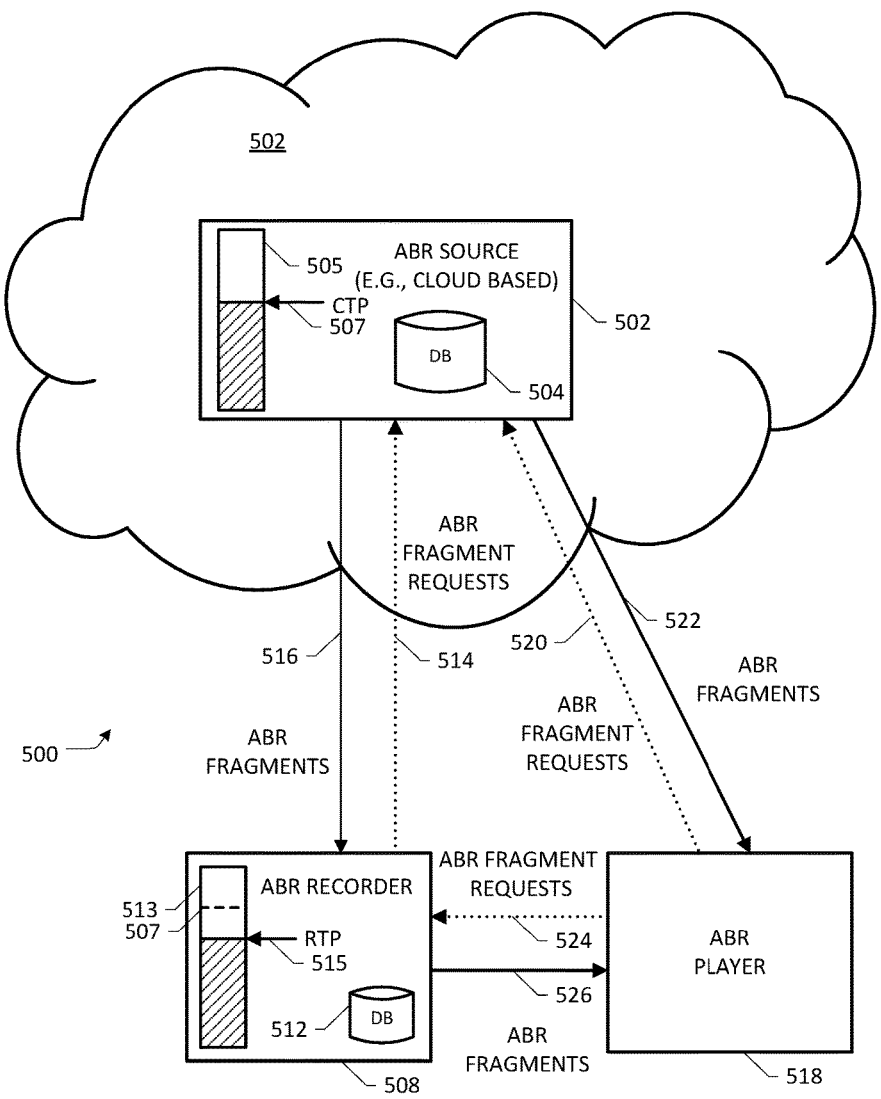
FIG. 5 depicts a further generalized ABR network architecture arrangement wherein a client recording device and an ABP player device may be provided for recording ABR content according to an example embodiment.

Turning to FIG. 5, depicted therein is a generalized ABR communications network 500 broadly representative of the various ABR communications environments described hereinbefore, wherein a client recording device 508 and an ABR player device 518 are provided for recording and/or playing recorded content according to any of the recording service selection mechanisms discussed above. Client recording device 508 (also referred to as a recorder) and ABR player device 518 are illustrative of the various client devices previously discussed and may be integrated in one example implementation as a single piece of equipment such as an STB coupled to a suitable display. Client recording device 508 is provided with a media storage unit 512 for storing various ABR programs downloaded from a suitable network- or cloud-based source 502 disposed in a network infrastructure 503, which may recorded using one or more recording service selection schemes of the present invention. ABR fragment requests 514 and receiving of ABR fragments 516 may be effectuated between ABR recorder 508 and the ABR source 502 via one or more streaming sessions. Likewise, ABR player device 518 is also operative to generate ABR fragment requests 520 to and receive ABR fragments 522 from the ABR source 502 via separate streaming sessions. A server database 504 is representative of network- or cloud-based ABR media assets, which may be centralized, clustered, distributed, or partitioned in a number of implementations, which in one arrangement is illustrative of the media asset package database 318 exemplified in FIG. 3.

ABR source node 502 may be provided with a live buffer 505 for facilitating one or more embodiments of a recording service selection mechanism of the present invention. Live buffer 505 is operative to buffer the media fragments that are being delivered to a client device, e.g., ABR recorder 508 that may be recording media at a slower time than a real-time or live time associated with the progression of a particular program content due to, for example, the application of a constant quality level requirement for recording. A suitable video buffer 513 may be provided at ABR recorder 508 for buffering the received ABR fragments before storing to the storage unit 512, with or without further processing, e.g., decoding/decrypting/re-encoding/re-encrypting, etc. With respect to the live buffer 505, a timing pointer 507 may be provided as a real-time content time parameter (CTP) that tracks the progression of the program content as it is being retrieved by the recorder device 508. A recording time pointer (RTP) 515 may be associated with the video buffer 513 of ABR recorder 508, which may fall behind the CTP for complex ABR program content under a constant bitrate quality requirement applied by the recording service selection mechanism executed by ABR recorder 508.

As noted above, ABR player 518 may be configured to execute a suitable playback service selection mechanism, which in one implementation may involve issuing one or more ABR fragment requests 524 to the local client recording device, e.g., ABR recorder 508, to render and display (i.e., play back) a select ABR program, either entirely therefrom or in combination with the program content available at the ABR source node 502. In situations where the connection conditions and bandwidth between the two local devices is more favorable (e.g., unconstrained bandwidth, better signal-to-noise conditions, etc.), ABR player 518 may be configured to selectively retrieve higher bitrate quality fragments from the local ABR recorder 508 while obtaining lower bitrate quality fragments from a remote source, e.g., ABR source node 502.

Figure 6:
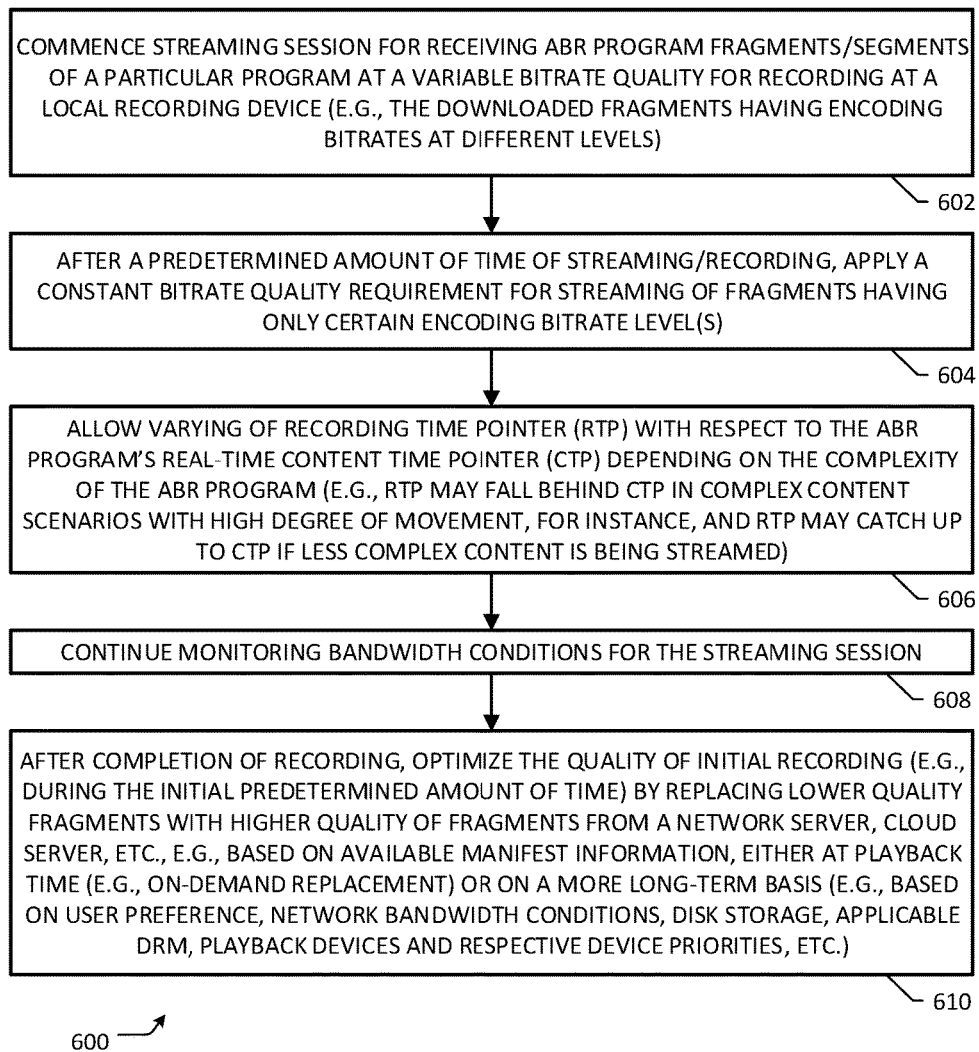
FIG. 6 depicts a flowchart of steps, acts, blocks and/or functions that may take place at a client recording device relative to an example process for recording ABR content according to one embodiment.

FIG. 6 depicts a flowchart of steps, acts, blocks and/or functions that may take place at a client recording device relative to an illustrative process for recoding ABR content according to an example embodiment. At block 602, a streaming session with an ABR server node is commenced by a client recording device for downloading, obtaining, retrieving, or otherwise receiving ABR program fragments/segments of a particular program at a variable bitrate quality for recording at a local storage unit of the recording device. As described previously, the downloaded fragments may have encoding bitrates at different levels depending on the bandwidth conditions of the network. One skilled in the art will readily appreciate that a recording request for a program may be effectuated in a number of ways, e.g., by launching a suitable user interface associated with an EPG or schedule at the client recording device for facilitating one or more program recording selections either to record a program immediately or at some scheduled time in the future. In one example implementation, an EPG may be launched by operating a traditional remote control device configured to work with the client recording device in accordance with practicing an embodiment of the present invention. In another implementation, an EPG interface may be provided or generated using other types of client devices that can interface with the client recording device as well, e.g., laptops, tablets, smartphones, etc., which may be provided with suitable "apps" for launching IPTV/video services, including recording services. Regardless of the specific implementation, EPG interface preferably comprises programming information for various channels, including timing information, program titles, etc., that may be provided in a scrollable grid. In one configuration, when a user selects a particular program for recording, a pull-down menu or dialog box may be provided as an overlay menu window or as a separate interface for presenting and/or setting a plurality of options relative to recording the selected program.

After a predetermined amount of time of streaming/recording, a recording service selection mechanism of the client recording device may be configured to apply a constant bitrate quality requirement for streaming of ABR fragments, e.g., segments having only certain encoding bitrate level(s), as set forth at block 604. By applying a constant quality requirement, a recording time pointer (RTP) associated with the client recording device's video buffer may be allowed to vary or fluctuate with respect to the ABR program's real-time content time pointer (CTP) maintained at the ABR server node depending on the complexity of the ABR program (e.g., RTP may fall behind CTP in complex content scenarios with a high degree of movement, for instance, and RTP may catch up with CTP if less complex content is being streamed) (block 606). Network bandwidth conditions for the ABR streaming session may continue to be monitored by the client recording device, and responsive thereto, one or more additional recording service selection mechanisms may be applied to modulate the recording behavior (block 608). After completion of recording, the quality of initial recording (e.g., during the initial predetermined amount of time) may be optimized by replacing lower quality fragments with higher quality of fragments from the ABR source node (e.g., a network server, cloud server, etc.) based on available manifest information, either at playback time (e.g., on-demand replacement) or on a more long-term basis (e.g., based on user preferences, network bandwidth conditions at different times of day (off-peak vs. peak usage), available disk storage, applicable Digital Rights Management (DRM) constraints, if any, as well as the type of playback/display devices coupled to the client recording device and respective device priorities, etc., as set forth at block 610. By way illustration, if the recorded program content is going to be watched on a small screen device that is capable of displaying only SD quality, an embodiment of the recording service selection mechanism may be configured to not retrieve higher quality fragments from the ABR server node. Likewise, where the available disk storage space is limited, retrieval of higher bitrate quality segments may be temporarily suspended. One skilled in the art will recognize that a myriad of use case scenarios may be obtained in accordance with a service selection mechanism within the scope of the present invention for modulating the recording behavior an example client recording device.

Figure 7:
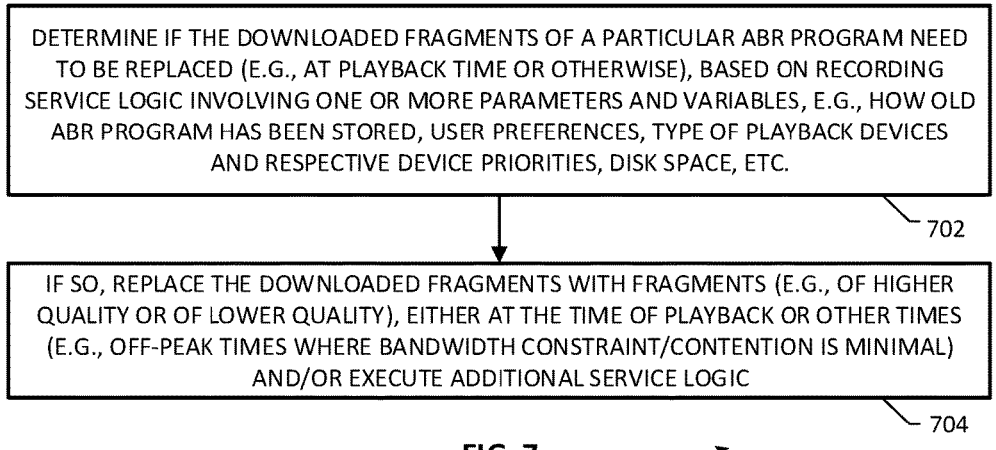
FIGS. 7-10 depict flowcharts of additional/alternative steps, acts, blocks and/or functions that may take place at a client recording device in combination or sub-combination with an illustrative process of FIG. 6 for recoding ABR content according to additional/alternative embodiments.

FIGS. 7-10 depict flowchart of additional/alternative steps, acts, blocks and/or functions that may take place at a client recording device in combination or sub-combination with an illustrative process of FIG. 6 for recoding ABR content according to additional/alternative embodiments of a recording service selection mechanism of the present invention. Process 700 of FIG. 7 illustrates a quality optimization mechanism that may be provided as part of a recording service selection module executing at a client recording device. At block 702, a determination may be made if the downloaded fragments of a particular ABR program need to be replaced (e.g., at playback time or otherwise), which may be based on recording service logic involving one or more parameters and variables, e.g., how old ABR program has been stored, user preferences, type of playback devices and respective device priorities, disk space, etc. As noted previously, replacement of ABR fragments may involve replacing higher bitrate quality fragments with lower bitrate quality fragments and/or vice versa. Where bandwidth constraints are relieved (e.g., during off-peak periods), and if enough the disk storage space is available, lower quality fragments may be selectively replaced by downloading higher quality fragments, as set forth at block 704. If a program has been stored for more than a configurable threshold of time (e.g., 6 months), additional service logic may determine to (i) delete ABR fragments having a range of higher bitrate quality levels; (ii) delete the entire set of ABR fragments; (iii) maintain only a single bitrate quality segments; (iv) upload the ABR fragments to a personal cloud or network PVR/DVR; (v) execute additional service logic to compress the media storage, generate an alert or notification to the user, etc.

Figure 8:
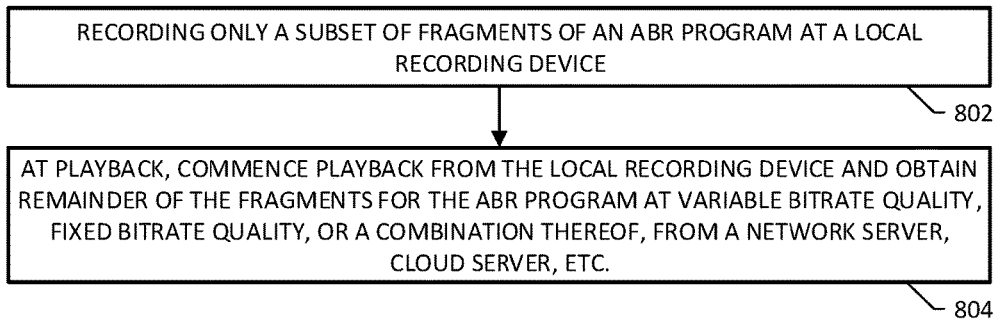

In the embodiment illustrated in FIG. 8, process 800 relates to a recording service selection mechanism that involves recording only a subset of fragments of an ABR program at the local recording device (block 802). As noted previously, at the time of playback by a player device, the recording device provides a set of manifest files to the player device, which commences playback of the locally stored content based thereon. In one variation, the recording device obtains the remaining ABR fragments from a server node and provides them to the player device. In another variation, the player device retrieves the remaining ABR fragments from the server node (block 804).

Figure 9:
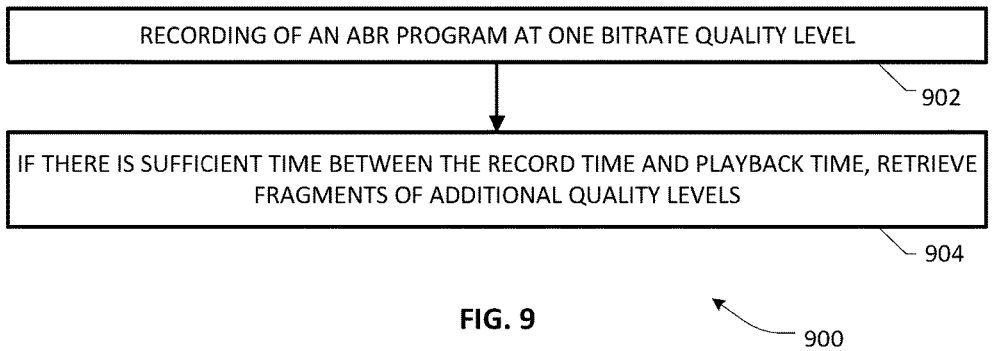

In the embodiment illustrated in FIG. 9, process 900 relates to a recording service selection mechanism that involves recording of an ABR program at one bitrate quality level, which may comprise a variable bitrate or a constant bitrate (block 902). Thereafter, if there is sufficient time between the record time and playback time, fragments of additional quality levels, e.g., a range of higher quality bitrate levels may be retrieved, as set forth at block 904.

Figure 10:
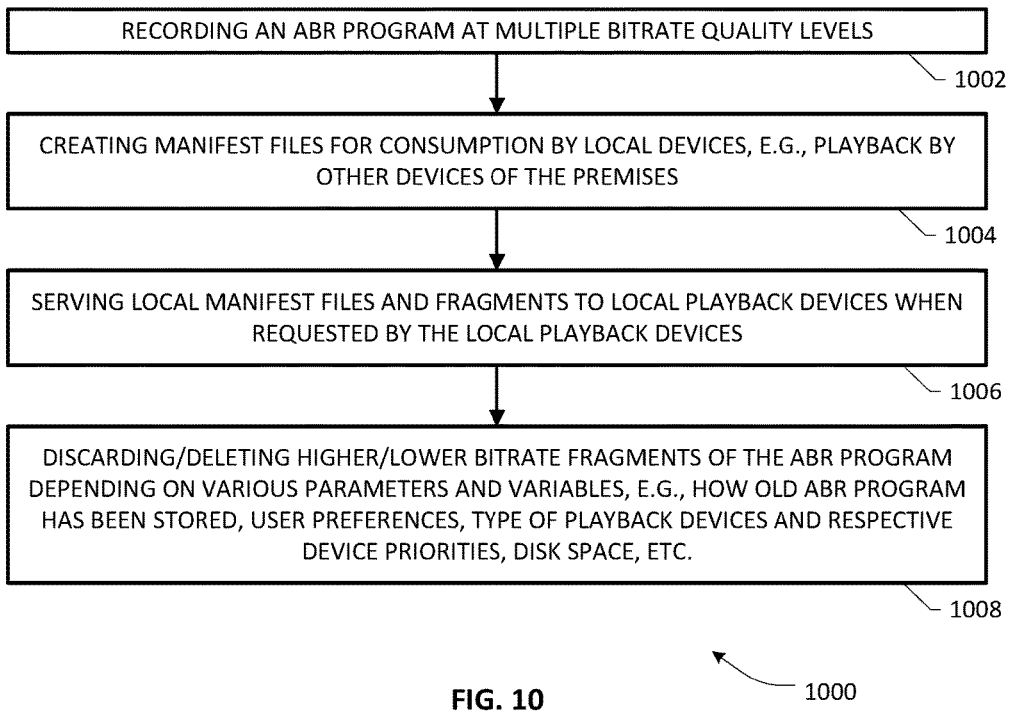

FIG. 10 depicts a flowchart of a process 1000 wherein a local recording device may operate as a local ABR server for a subscriber premises. At block 1002, an ABR program may be recorded at multiple bitrate quality levels, e.g., a subset of available bitrates identified in manifest files provided by a network ABR server. A set of local manifest files may be created that point to the location(s) of the downloaded ABR fragments on the local storage for facilitating consumption of the stored program content via local ABR sessions, e.g., for playback by other devices of the subscriber premises (block 1004). When requested by a local player device, local manifest files and ABR fragments are served by the recording device (block 1006). Optionally, ABR fragments of higher or lower bitrate levels or ranges thereof may be deleted in accordance with a selection mechanism based on various parameters as set forth at block 1008.

Figure 11:
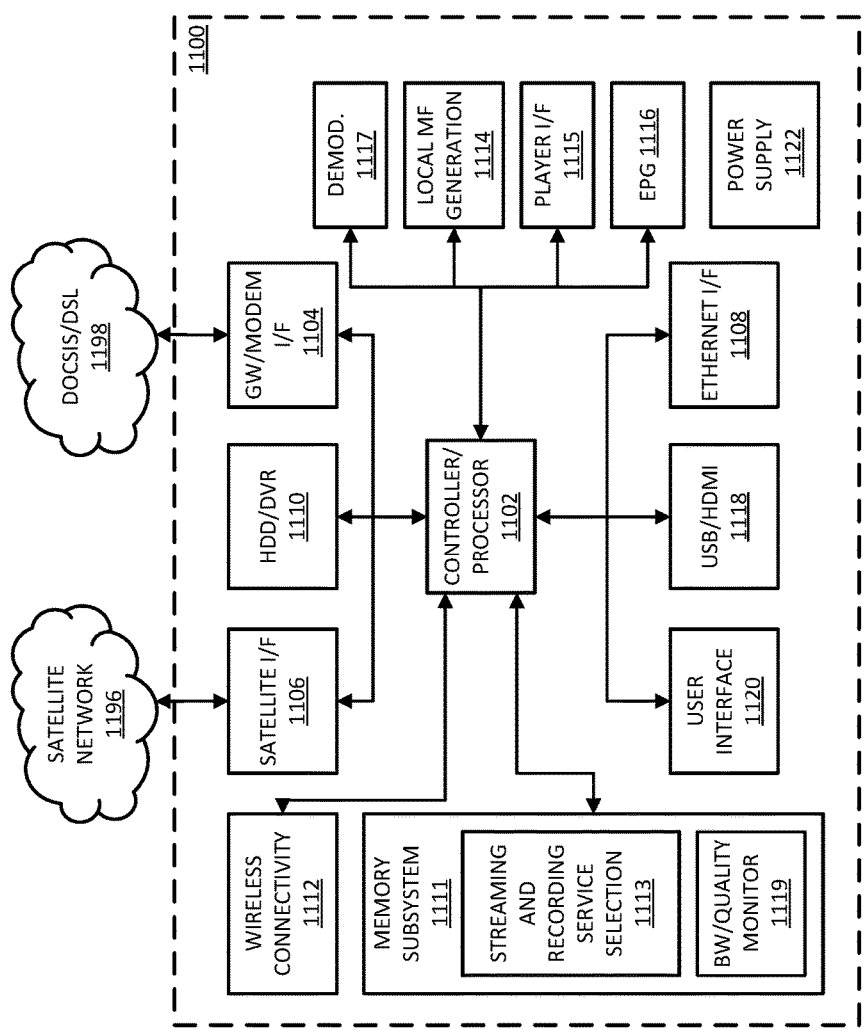
FIG. 11 is a block diagram of an example client device or subscriber station operative for facilitating recording of ABR content based on one or more recording service selection mechanisms according to an embodiment of the present patent disclosure.

FIG. 11 is a block diagram of an example client device or subscriber station operative for facilitating recording of ABR content based on one or more recorder or recording service selection mechanisms according to an embodiment of the present patent disclosure. By way of illustration, device 1100 is exemplified as an STB having a local recorder that is generally representative of an ABR client recording device shown in some of the Figures described above, and may include appropriate hardware/software components and subsystems configured for performing any of the device-side processes (either individually or in any combination thereof) with respect to implementing one or more recording service selection mechanisms, metadata parsing and local MF generation for purposes of the present patent application. One or more microcontrollers/processors 1102 are provided for the overall control of the client device 1100 and for the execution of various stored program instructions embodied in a persistent memory 1113, e.g., as a streaming client application having recorder service selection logic or capability that may be part of a memory subsystem 1111 of the client device 1100. Additionally, the recorder service selection logic 1113 may be interfaced with video quality monitoring as well as connection bandwidth monitoring functionalities or modules 1119 for effectuating one or more embodiments of the present invention described hereinabove. Controller/processor complex referred to by reference numeral 1102 may also be representative of other specialty processing modules such as graphic processors, video processors, digital signal processors (DSPs), and the like, operating in association with suitable video and audio interfaces (not specifically shown). Appropriate interfaces such as I/F modules 1104 and 1106 involving or operating with tuners, demodulators, descramblers, MPEG/H.264/H.265 decoders/demuxes may be included for processing and interfacing with ABR-based content signals received via a DSL/CMTS network 1198 or a satellite network 1196 or as an OTT application. Example demodulators 1117 may include NTSC demodulator(s) and/or ATSC/PAL demodulator(s), and the like. A local manifest file generator module 1114 is operative in conjunction with the streaming client and recording election module 1113 for generating appropriate manifest and/or other metadata with respect to local consumption of the stored ABR content by other devices. Additional I/O interfaces 1115 such as a display interface or a local player device interface, EPG interface 1116 for identifying media service channels, user interface 1120, USB/HDMI ports 1118, Ethernet I/F 1108, and short-range and wide area wireless connectivity interfaces 1112 are also provided. A hard disk drive (HDD) or DVR system 1110 may be included as an ABR recorder for local storage of all sorts of program assets such as A/V media, TV shows, movie titles, multimedia games, etc. in accordance with one or more recording service selections mechanisms of the present invention. Also included in client device 1100 is a suitable power supply block 1122, which may include AC/DC power conversion to provide power for the device 1100. It should be appreciated that the actual power architecture for the subscriber device 1100 may vary by the hardware platform used, e.g., depending upon the core SoC (System-on-Chip), memory, analog front-end, analog signal chain components and interfaces used in the specific platform, and the like.

One skilled in the art will further recognize that various apparatuses, subsystems, functionalities/applications and/or one or more network elements as well as the underlying network infrastructures set forth above for facilitating a recording service selection scheme may be architected in a virtualized environment according to a network function virtualization (NFV) architecture in additional or alternative embodiments of the present patent disclosure. For instance, various physical resources, databases, services, applications and functions executing within an example network, e.g., network architectures shown in FIGS. 1-5 may be provided as virtual appliances, machines or functions, wherein the resources and applications are virtualized into suitable virtual network functions (VNFs) or virtual network elements (VNEs) via a suitable virtualization layer. Resources comprising compute resources, memory resources, and network infrastructure resources are virtualized into corresponding virtual resources wherein virtual compute resources, virtual memory resources and virtual network resources are collectively operative to support a VNF layer, whose overall management and orchestration functionality may be supported by a virtualized infrastructure manager (VIM) in conjunction with a VNF manager and an NFV orchestrator. An Operation Support System (OSS) and/or Business Support System (BSS) component may typically be provided for handling network-level functionalities such as network management, fault management, configuration management, service management, and subscriber management, etc., which may interface with VNF layer and NFV orchestration components via suitable interfaces.

Furthermore, at least a portion of an example network architecture disclosed herein may be virtualized as set forth above and architected in a cloud-computing environment comprising a shared pool of configurable virtual resources. Various pieces of software, e.g., ABR encoding schemes, segmentation mechanisms, media asset package databases, etc., as well as platforms and infrastructure of an ABR network may be implemented in a service-oriented architecture, e.g., Software as a Service (SaaS), Platform as a Service (PaaS), infrastructure as a Service (IaaS) etc., with multiple entities providing different features of an example embodiment of the present invention, wherein one or more layers of virtualized environments may be instantiated on commercial off the shelf (COTS) hardware. Skilled artisans will also appreciate that such a cloud-computing environment may comprise one or more of private clouds, public clouds, hybrid clouds, community clouds, distributed clouds, multiclouds and interclouds (e.g., "cloud of clouds", and the like.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method operating at a client recording device disposed in an adaptive bitrate (ABR) communications network, the method comprising:
    receiving ABR program fragments of a particular program from a network node for recording at the client recording device via an ABR streaming session, the ABR program fragments comprising segments of varying bitrate quality; and
    after a predetermined amount of time, applying a constant bitrate quality requirement for receiving ABR program fragments encoded at a specified bitrate, thereby allowing a recording time pointer (RTP) associated with the client recording device's video buffer to vary with respect to the particular program's real-time content time parameter (CTP), wherein the RTP is configured to lag behind the CTP for complex ABR program content depending on bandwidth available for the ABR streaming session.

2. The method as recited in claim 1, wherein the ABR program fragments comprising segments of varying bitrate quality are received initially for the predetermined amount of time upon starting the ABR streaming session.

3. The method as recited in claim 1, further comprising:
    monitoring network bandwidth conditions relative to the ABR streaming session; and
    allowing the RTP associated with the client recording device's video buffer to catch up to the ABR program's CTP when the network bandwidth conditions improve.

4. The method as recited in claim 1, further comprising:
    after completion of recording the particular program, replacing the ABR program fragments comprising segments of varying bitrate quality received initially for the predetermined amount of time with ABR program fragments comprising segments of higher bitrate quality from the network node based on manifest file information made available to the client recording device during the streaming session.

5. The method as recited in claim 4, wherein the ABR program fragments comprising segments of varying bitrate quality received initially for the predetermined amount of time are replaced with the ABR program fragments comprising segments of higher bitrate quality from the network server at the time of playing back the particular program at a client player device coupled to the client recording device.

6. The method as recited in claim 4, wherein the ABR program fragments comprising segments of a select range of bitrate quality levels are deleted from the client recording device after determining at least one of: (i) a certain amount of time has elapsed since the particular program has been recorded, (ii) the client recording device's available storage space has reached a certain capacity limitation, and (iii) number of times the particular program has been played back over a certain duration of time has fallen to a threshold value.

7. The method as recited in claim 1, further comprising:
    terminating the ABR streaming session before completion of recording the particular program, thereby storing a partial program content of the particular program at the client recording device;
    at a subsequent time of playing back the particular program at a client player device, commencing playback of the partial program content from the client recording device; and
    obtaining remainder of ABR fragments of the particular program from the network node at a bitrate quality depending on available bandwidth.

8. A client recording device operative in an adaptive bitrate (ABR) communications network, comprising:
    one or more processors and a storage unit coupled thereto, the storage unit operative to store ABR program fragments for one or more programs downloaded from one or more network nodes via respective ABR streaming sessions;
    a bandwidth monitor configured to monitor bandwidth conditions on a network connection relative to the one or more ABR streaming sessions; and
    a persistent memory module coupled to the one or more processors and having program instructions stored therein, which program instructions are configured perform when executed by the one or more processors:
        facilitate receiving ABR program fragments of a particular program from a network node for recording at the storage unit via an ABR streaming session, the ABR program fragments comprising segments of varying bitrate quality; and
        apply, after a predetermined amount of time, a constant bitrate quality requirement for receiving ABR program fragments of the particular program encoded at a specified bitrate, thereby allowing a recording time pointer (RTP) associated with the client recording device's video buffer to vary with respect to the particular program's real-time content time parameter (CTP), wherein the RTP is configured to lag behind the CTP for complex ABR program content depending on bandwidth conditions relative to the ABR streaming session.

9. The client recording device as recited in claim 8, wherein the program instructions further comprise instructions configured to allow the RTP associated with the client recording device's video buffer to catch up to the ABR program's CTP when the network connection's bandwidth conditions improve.

10. The client recording device as recited in claim 8, wherein the program instructions comprise instructions configured to facilitate receiving the ABR program fragments initially as segments of varying bitrate quality for the predetermined amount of time upon starting the ABR streaming session.

11. The client recording device as recited in claim 10, wherein the program instructions further comprise instructions configured to replace the ABR program fragments comprising segments of varying bitrate quality received initially for the predetermined amount of time with ABR program fragments comprising segments of higher bitrate quality from the network node based on manifest file information made available to the client recording device during the ABR streaming session.

12. The client recording device as recited in claim 10, wherein the program instructions further comprise instructions configured to replace the ABR program fragments comprising segments of varying bitrate quality received initially for the predetermined amount of time with the ABR program fragments comprising segments of higher bitrate quality from the network node at the time of playing back the particular program at a client player device coupled to the client recording device.

13. The client recording device as recited in claim 10, wherein the program instructions further comprise instructions configured to delete from the storage unit segments of a select range of bitrate quality levels after determining at least one of: (i) a certain amount of time has elapsed since the particular program has been recorded, (ii) the client recording device's available storage space has reached a certain capacity limitation, and (iii) number of times the particular program has been played back over a certain duration of time has fallen to a threshold value.

14. The client recording device as recited in claim 8, wherein the program instructions further comprise instructions configured to:
   terminate the streaming session before completion of recording the particular program, thereby storing a partial program content of the particular program at the storage unit; and
   obtain, at a subsequent time of playing back the particular program, remaining ABR fragments of the particular program from the network node at a bitrate quality depending on available bandwidth.

* * * * *